United States Patent
Graff

[11] 3,757,492
[45] Sept. 11, 1973

[54] ADSORBER METHOD AND APPARATUS
[76] Inventor: Roderich W. Graff, Kollwitzweg 19, Darmstadt-Arheilgen, Germany
[22] Filed: May 20, 1971
[21] Appl. No.: 145,312

[30] Foreign Application Priority Data
May 23, 1970 Germany.................. P 20 25 205.5

[52] U.S. Cl. ................................... 55/181, 59/390
[51] Int. Cl. ............................................ B01d 53/06
[58] Field of Search ................... 55/33, 34, 78, 179, 55/181

[56] References Cited
UNITED STATES PATENTS
| | | | |
|---|---|---|---|
| 3,487,608 | 1/1970 | Graff | 55/179 X |
| 2,799,362 | 7/1957 | Miller | 55/34 X |
| 3,164,454 | 1/1963 | Wilson | 55/179 X |
| 2,561,441 | 7/1951 | Lou | 55/179 X |
| 2,771,964 | 11/1956 | Miller | 53/78 X |
| 3,552,096 | 1/1971 | Darson | 55/179 X |

Primary Examiner—John Adee
Attorney—Michael S. Striker

[57] ABSTRACT

An adsorption medium is confined in at least two discrete chambers. A stream of water vapor is passed through one of the chambers for a predetermined time and thereupon through the other of the chambers. A stream of heated gas is passed through the first chamber after flow of the stream of water vapor therethrough has terminated, in order to regenerate the adsorbing medium in the first chamber. During part of the time for which the stream of heated gas is passed through the first chamber, some of the gas issuing from the first chamber is recirculated into the regenerating circuit and/or supplied to the second chamber subsequent to termination of the flow of the stream of water vapor therethrough.

3 Claims, 8 Drawing Figures

3,757,492

INVENTOR.
RODERICH W. GRAFE

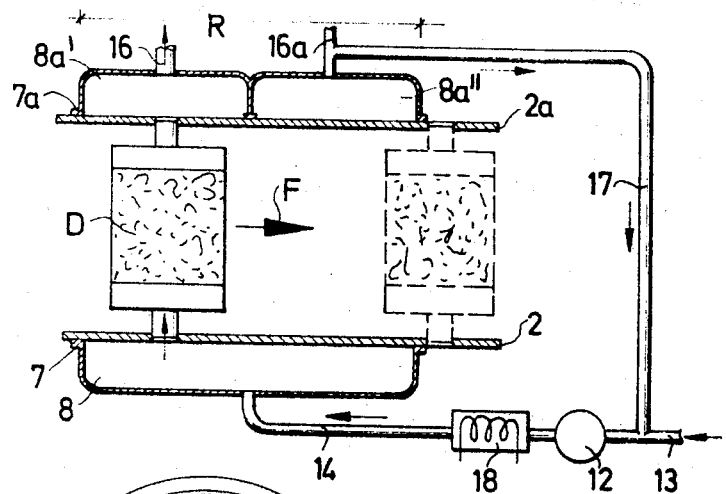
Fig. 3
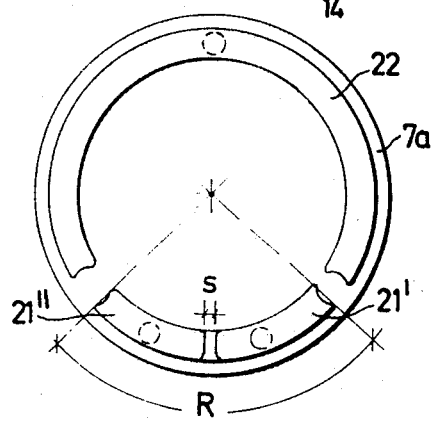
Fig. 4
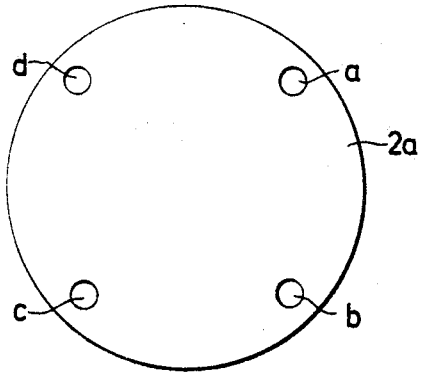

ADSORBER METHOD AND APPARATUS

CROSS-REFERENCE TO RELATED APPLICATION

A related application was filed in my name on Dec. 15, 1970 and is copending under Ser. No. 98,289.

BACKGROUND OF THE INVENTION

The present invention relates generally to a method and an apparatus for adsorbing of water vapor from gases, particularly from air.

Such methods and apparatus are for instance employed in the plastic-working industry as air dryers, which is the name that will be employed for them hereafter for the sake of simplicity, althrough they have of course a wider range of applicability. Generally speaking, a distinction may be made in such air dryers between a type having two or more chambers which are stationary and filled with an adsorbing medium and which are alternately or cyclically connected by suitable valves with a regenerating circuit and adsorbing circuit (known as the Whitelock or Una-Dyn systems) and a type of dryer in which two or more chambers rotate slowly about a common axis and are connected via flat plate valves which turn with them to the fixedly mounted conduit of the regenerating and adsorbing circuits. My copending application, mentioned above, is concerned with this latter type.

In either case, however, it will be realized without specifically emphasizing that during the regenerating cycle, that is while the chambers are connected with the regenerating circuit, the passage of the regenerating fluid through the chambers (usually hot air heated to approximately 250°C) heats the adsorbing medium contained in the chambers and spent by previous connection with the adsorbing circuit, and thus frees the adsorbing medium from the previously adsorbed molecules, that is the adsorbing medium becomes regenerated.

However, the prior art requires a substantial energy use for heating the regenerating air, and of course to a large extent the efficiency of an adsorber of the type under discussion depends upon the degree to which the adsorber is heated. The art already knows an arrangement in which a portion of the air which issues from the chamber being regenerated and which is laden with moisture, is returned to the suction side of a blower incorporated in the regenerating circuit and supplying regenerating air to the chamber being regenerated. This means that energy is saved insofar as the recirculated quantity of air is concerned.

However, it is well known that towards the end of the regenerating cycle a cooling period is necessary because only cooled adsorbing medium is capable of renewed adsorbing activity, meaning that it cannot be utilized for adsorbing purposes when it is in heated state and that generally speaking these installations are of such type that it is not possible to wait prolonged periods of time for the heated adsorbing medium to cool down slowly. The aforementioned prior-art construction which recirculates a part of the regenerating air, adversely influences the cooling effect, that is it prolongs the required cooling period, because a certain portion of the regenerating air will always be heated and will thus prolong the heated state of the adsorbing medium. Also, when the regenerating air is at least in part recirculated it is moisture laden and this is disadvantageous because when it then returns back into the chamber whose adsorbing medium has been regenerated, and wherein the adsorbing medium slowly cools down, the air carries with it this moisture which becomes immediately adsorbed in the adsorbing medium and reduces the adsorbing capacity of the medium contained in the chamber before the latter can even be connected again with the adsorbing circuit. The recirculation of a quantity of the regenerating air in this prior-art device takes place throughout the regenerating cycle, and as a result of this there is the additional disadvantage that at the beginning there will be strong condensation activity in the branch of the circuit which returns the moisture-laden air into the regenerating circuit, because at this time the regenerating air which issues from the chamber and is recirculated into the regenerating circuit, is still relatively cool but highly saturated with moisture.

SUMMARY OF THE INVENTION

It is, accordingly, an object of the present invention to overcome the aforementioned disadvantages.

More particularly it is an object of the present invention to provide a novel method which avoids these disadvantages, and an apparatus for carrying out the novel method.

In pursuance of the above objects, and of others which will become apparent hereafter, one feature of the invention resides in an adsorption method for adsorbing water vapor from gaseous fluid, which briefly stated comprises the steps of confining an adsorption medium in at least two discrete adsorption chambers. A first stream of water vapor is passed for a predetermined period of time through one of the chambers whereupon passage of the first stream through this one chamber is terminated and passage of the first stream through the other of the chambers is initiated. While the first stream passes through the other chamber, a second stream of heated gas is passed through the one chamber for a given regenerating time, and after passage of a fraction of this given time the passage of the first stream through the other chamber is terminated while at least a portion of the second stream issuing from the one chamber is now diverted into and recirculated into one or both of the two chambers.

This means that the quantity of heat still contained in the regenerating gas, usually air, after the latter has been passed once through the chamber being regenerated can largely be recovered. Of course, during the initial part of the regenerating time the regenerating air is blown off into ambient atmosphere.

This novel approach is in contrast with an approach known from the art in which both the gas to be dried as well as the regenerating gas pass sequentially through the series of chambers, and sometimes even are admixed during such passage. Aside from this admixture which, of course, is inadvisable, the prior art makes it impossible for recovering heat, or at least to recover heat without having to accept substantial disadvantages in terms of the effectiveness of the method, because the regenerating air which issues at the beginning of a regenerating cycle from a chamber being regenerated, has yielded up most of its heat to the initially cold regenerating chamber and is therefore rather cool, while on the other hand it is already highly saturated with water vapor. To return this initial quantity of regenerating air into the chamber or into the next-following chamber to be regenerated, would be disadvantageous because it would supply additional water vapor without applying heat for expelling it. It is therefore important in terms of the present invention that for the initial time of the regenerating period the regenerating medium be vented to the ambient atmosphere, and that only later on the recirculation of all or some of the regenerating medium take place.

An apparatus according to the present invention may advantageously be of the type having two or more chambers which are filled with adsorbing medium and which alternately or cyclically can be connected by suitable valve means with an adsorbing circuit and a regenerating circuit which latter includes a blower and a source of heat. According to one embodiment of the novel apparatus the regenerating circuit is branched in a control component located behind the chamber connection and one branch is returned to the intake side of the blower whereas the other branch is vented to the ambient atmosphere. During one portion of the regenerating cycle, during which the regenerating circuit is closed, no energy is lost. During the other portion of the regenerating cycle the regenerating air is vented to the ambient atmosphere and is replaced by fresh air via the intake side of the blower. This latter portion of the regenerating cycle is, of course, the cooling phase thereof. This embodiment is very simple but does have the slight drawback that during the cooling phase the heater, which has a significant heating capacity, must also be cooled down to the cooling temperature because the incoming air necessarily must pass over the heater which must be located between the blower and the chamber being regenerated, and of course this results in a prolongation of the cooling down phase and a loss of energy.

According to a further embodiment of the invention the control component located upstream of the chamber connection may be provided with a branch circuit through which the recirculated regenerated medium can pass, or through which in the cooling phase cooling fresh air can be taken in by the blower and supplied directly into the regenerated chamber without having to pass over or through the heater.

Still a further embodiment of the invention, which may also be combined with the first-mentioned one, also provides for a branching of the regenerating circuit in a control component which, however, is located downstream of the chamber connection. A branch is then returned to the control component located upstream of the chamber connection in such a manner that two chambers which are connected to the regenerating circuit via the two control components are connected in series. The regenerating air which issues from the first chamber —as seen with respect to the flow direction of the regenerating air— will be at a relatively high temperature because this first chamber is already at or near the end of this regenerating cycle, and is now supplied to the next chamber in which regeneration is just beginning. The regenerating air is then vented to the ambient atmosphere only after having passed through the next or second chamber. This means that the heat of the regenerating air, which would be lost if the latter were vented directly after leaving the first chamber, is largely recovered and put to use in the second chamber. Here, again, a bypass or branch circuit can be utilized to bypass the heater during the cooling phase.

It is emphasized that the present invention can be utilized with all known types of adsorber constructions with either stationary or movable chambers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a diagrammatic flow diagram of one embodiment of the invention illustrating the regenerating cycle;

FIG. 4 is a plan view of the two flat plates of a control component for use in the embodiment of FIG. 3;

DESCRIPTION OF THE PREFERRED EMBODIMENTS

Figure 1:
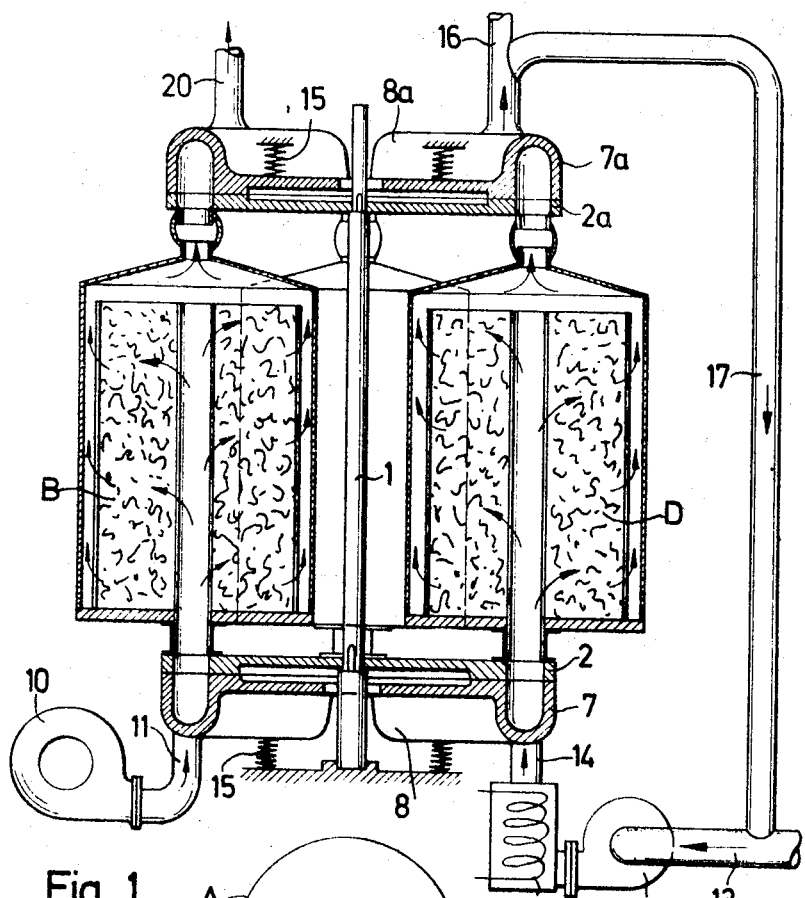
FIG. 1 is a somewhat diagrammatic longitudinal section of a four-chamber adsorber with rotating chambers and a flat-plate valve control.
Figure 2:
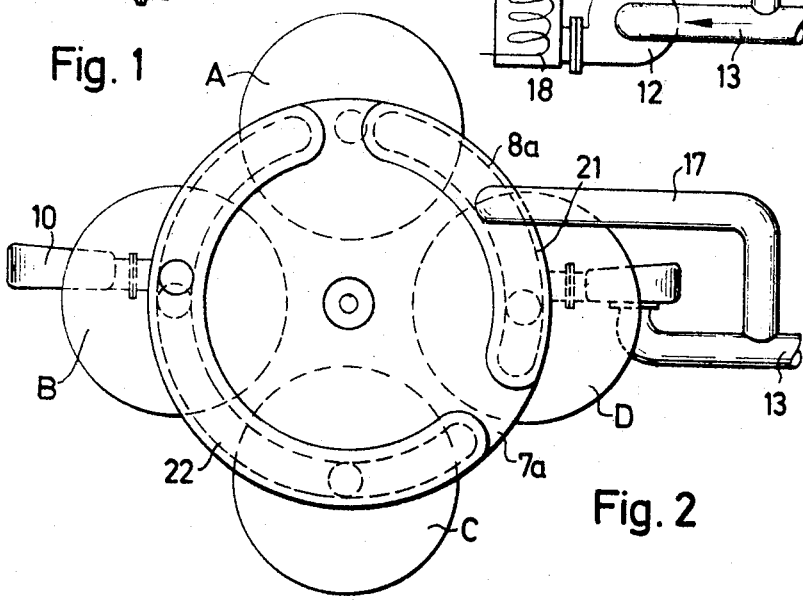
FIG. 2 is a top-plan view on the upper hood of the device shown in FIG. 1.

Before entering into a more detailed discussion of the various possibilities for controlling the regenerating cycle, it is thought advisable to discuss firstly the construction of a four-chamber adsorption dryer as illustrated in FIGS. 1 and 2, being provided with two flat-plate control components or valves. In this embodiment as illustrated in FIGS. 1 and 2, a shaft 1 is turnably mounted and provided with two apertured plates 2 and 2a between which there are mounted four chambers A, B, C and D each of which is charged with a quantity of adsorbing medium, any of the well known adsorbing media capable of regenerating being suitable for this purpose.

The drive for shaft 1 is not illustrated in order to keep the illustration simple, but it will be understood that the shaft 1 is rotatable about its longitudinal axis. A pair of control plates 7 and 7a are stationary and pressed by springs 15 against the apertured plates 2 and 2a, respectively so that they constitute with the respective plates flat-plate control components or valves by means of which the individual chambers A - D are cyclically connected with the adsorbing and regenerating circuits. Hoods 8 and 8a close off the plates 7 and 7a to the exterior and are connected with conduits 14, 17 and 11, 20 of the two circuits (adsorbing and regenerating). The shaft 1 turns, together with the plates 2 and 2a and the chambers A - D mounted between these plates, and all of these components rotate between the stationary plates 7 and 7a.

During the adsorbing cycle a blower 10 takes in the air to be dried and passes it through the conduit 11 and the cooperating plates 7 and 2 into and through the adsorbing medium contained in the chamber B. From the latter it leaves through plates 2a and 7a and the conduit 20 and continues in a predetermined circuit, for instance being passes into and through a hopper containing synthetic plastic granulate into and through which the now heated dry air is to flow. An additional blower 12 is provided which draws fresh air from the ambient atmosphere out of a conduit 13 and passes it via a heating chamber 18 and the cooperating plates 7 and 2 into the adsorbing medium contained in the chamber D. Depending upon the particular adsorbing medium used, the air is heated in the chamber 18 which is thermostatically controlled, to a requisite temperature, for instance on the order of 250°– 350°C, in order to expel the water vapor which has saturated the adsorbing medium contained in the chamber D. The thus vapor-laden regenerating air issues from the chamber D via the plates 2 a and 7a and in part escapes to the ambient atmosphere through the outlet 16 whereas a part enters into the conduit 17. The part which leaves through the outlet 16 is replaced by ambient air through the intake 13, whereas the conduit 17 recirculates a part of the regenerating air to the blower 12 with the result that the energy requirements for heating of the air are reduced because the temperature-dependent adsorbing capability of the air for water vapor is fully utilized in this manner. On the other hand, the recirculated hot regenerating air does have the disadvantage that it will prolong the cooling phase which follows towards the end of the regenerating phase.

Control of the adsorbing air and the regenerating air can be effected via an apertured plate together with a flat plate or control plate at the upstream and, if desired, also at the downstream side. In the arrangement of FIGS. 1 and 2, which is strictly intended for explanatory purposes, the two control components composed of the plates 7 and 2 on the one hand, and the plates 7a and 2a on the other hand, are congruent. The plate 7a is provided with two control slots 21 and 22 of different length which are located on respective arcs and of which one is associated with the regenerating circuit and the other with the adsorbing circuit. In the discussion following hereafter only the control of the regenerating circuit is emphasized because it is this control which is of importance for purposes of the present invention.

It will be seen that in FIGS. 1 and 2 the chamber D is connected in the regenerating circuit, whereas the chamber A will become connected with the regenerating circuit next, when the chambers and shaft 1 turn in clockwise direction. Shortly after the chamber A also becomes connected with the regenerating circuit, the chamber D (in which the adsorbing medium has been regenerated and cooled) leaves the regenerating circuit and becomes connected with the adsorbing circuit.

Discussing now the embodiments according to the present invention as illustrated in FIGS. 3–8 it is emphasized that various possibilities are shown in these Figures for control of the regenerating cycle R, and that reference numerals in these Figures which correspond to those utilized in FIGS. 1 and 2 designate corresponding elements. In all embodiments the direction of displacement is assumed to be from left towards the right in the direction of the arrow F.

Coming now to FIG. 3 it will be seen that the construction of the regenerating circuit corresponds to that illustrated in FIG. 1, except for a modification in the upper flat plate control component. In FIG. 3 the control slot is now subdivided into two slots 21' and 21" as evident from the plan view of the two plates illustrated in FIG. 4. The hood is also subdivided into two parts 8a' and 8a" each of which corresponds and cooperates with one of these two slots. The regenerating air which is heated in the chamber 18 is supplied by the blower 12 via the conduit 14 into the lower hood 8 and leaves through the lower control components 2, 7 to enter into the chamber D to be regenerated. From there is leaves during the first part of the regenerating cycle through the slot 21' of the upper control component 2a, 7a to enter into the hood 8a' and to be vented from the same through the outlet 16 into the ambient atmosphere. During the second part of the regenerating cycle, however, the air issuing from the chamber D passes through the slot 21" into the hood 8a" and is taken from the latter into the suction side of the blower 12 via the conduit 17, to be returned into the regenerating circuit. Furthermore, a controlled partial amount can also be vented to the exterior through the outlet 16a and is replaced with fresh ambient air through the inlet 13. This means that the heat utilized during this phase is completely or partially recovered, and it is pointed out that while the air in conduit 14 may for instance have a temperature of 240°C, its temperature in the conduit 17 is still either about 70°C or even higher.

A glance at FIG. 4 will facilitate an understanding of the flow control. It is seen there that the control plate 7a has slots 21', 21" and 22, whereas the apertured plate 2a is provided with inlet and outlet openings a, b, c and d which are associated with the four chambers A - D. The circles which are shown in broken lines in the control plate 7a are intended exclusively to show different positions of a single one of these openings of the plate 2a, for instance of the opening a thereof, with respect to the plate 7a during the relative displacement of the plates 2a and 7a.

It will be appreciated that the length and configuration of the segments of the plate 7a between the individual control slots determines the switching functions between the individual phases. Thus, one chamber may for instance be completely switched out of one circuit before it enters into the next one, and in the arrangement according to FIG. 4 it will be seen that any chamber in the regenerating circuit is connected for a brief period of time both with the hood 8' as well as with the hood 8", because the distance s between the control slots 21' and 21" is smaller than the diameter of the apertures a - d. Coming to the embodiment in FIG. 5 it will be seen that here both of the control components are constructed in a manner analogous with FIG. 3. In other words, both of the control components have the control slots and hoods subdivided as is indicated for only one control component in FIG. 3. Two chambers A and D are here connected with the regenerating circuits and, keeping in mind that uniform speed of rotation for assumed for all of these embodiments, it will be seen from FIG. 5 that the upper and lower control slot portions are of different length. The lower hood 8' is again connected via the conduit 14 with the heating chamber 18, whereas the hood 8" is connected via a branch conduit 19 directly with the pressure side of the blower 12. The purpose of this arrangement is to facilitate the cooling-down towards the end of the regenerating cycle. It will be appreciated that at the beginning of the regenerating phase, that is when a chamber is in the position illustrated with respect to chamber A, one chamber receives hot regenerating air which passes from the hood 8a' via the outlet 16 into the ambient atmosphere. Later, towards the middle of the regenerating period which is illustrated with respect to the position of the chamber D, the air issuing from this chamber enters into the hood 8a'' and is returned to the blower 12 via the conduit 17. Towards the end of the regenerating period, however, the chamber now located between the hoods 8'' and 8a' and communicating with both, is cooled down by a mixture of recirculated regenerating air and fresh air taken in via the inlet 13, whereas via the heating chamber 18 and the conduit 14 the next-following chamber is being regenerated.

Figure 5:
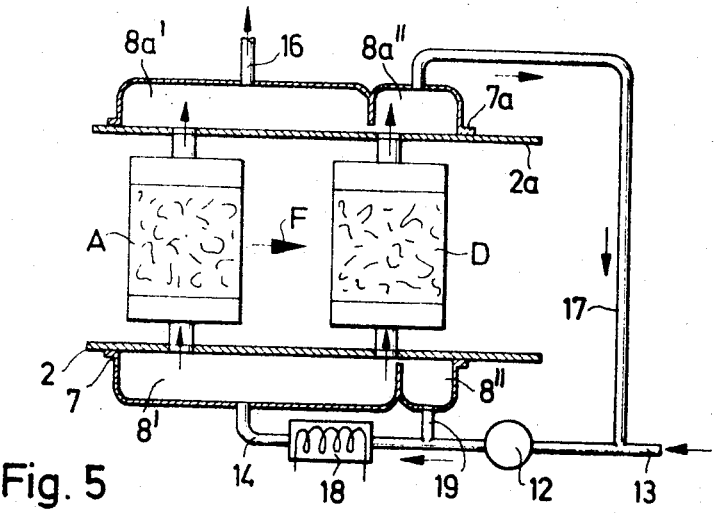
FIG. 5 is a view similar to FIG. 3 but of a different embodiment.
Figure 6:
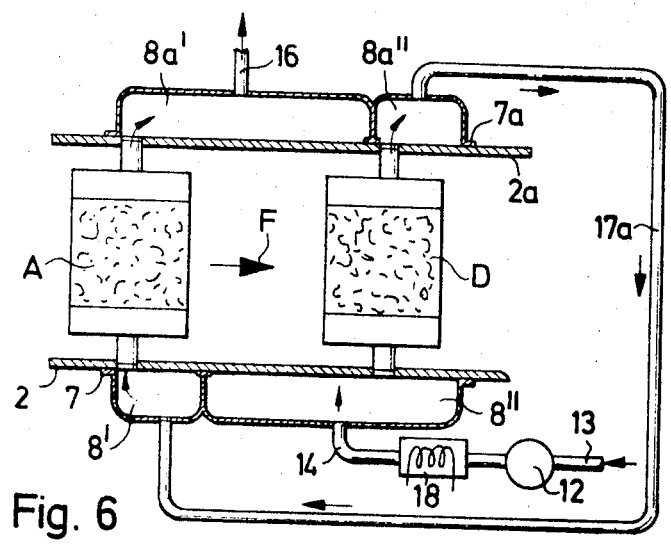
FIG. 6 is a view similar to FIG. 5 but of a different embodiment.

Coming to the embodiment of FIG. 6, it will be seen that here, where the distribution of the slot length in the lower control component utilizing the plates 7 and 2 is different from FIG. 5, the recirculated regenerating air is utilized for predrying or pre-regenerating a chamber at the beginning of the regenerating cycle of another chamber, in that the conduit 17a is connected not to the suction side or intake side of the blower 12, but instead to the first hood 8'. Only towards the middle of the regenerating cycle will the chamber then receive regenerating air which has been heated to a high degree. As long as the contents of the chamber (the adsorbing medium) have a high moisture content, the regenerating air is vented to the atmosphere via the hood 8a' and the outlet 16, but towards the end of the cycle the regenerating air is returned via the hood 8a'' and the conduit 17 into the regenerating circuit.

Figure 7:
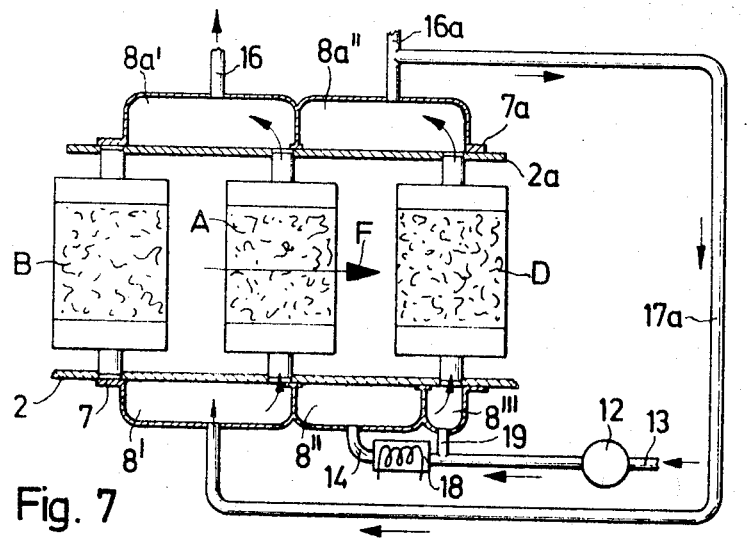
FIG. 7 is a view similar to FIG. 6 illustrating yet a further embodiment.

In the embodiment of FIG. 7 I have illustrated an arrangement which essentially is a combination of the arrangements of FIGS. 5 and 6, with a slightly different timing of the control. Here the upper control component utilizing the plates 2a and 7a is so constructed that the regenerating cycle is halved, whereby an optimum heat recovery factor is obtained. The second half of the timing cycle of the regenerating cycle is in turn subdivided in that towards its end —as a result of the lower control component utilizing the hoods 8', 8'' and 8'''— a cooling period in accordance with the embodiment of FIG. 5 is provided via a bypass branch to the heating chamber 18, utilizing a conduit 19. This embodiment, which will be readily understood from the drawing without further explanations, is particularly suitable for large size adsorber units with more than four chambers because, as FIG. 7 shows, the chambers are relatively close to one another.

Figure 8:
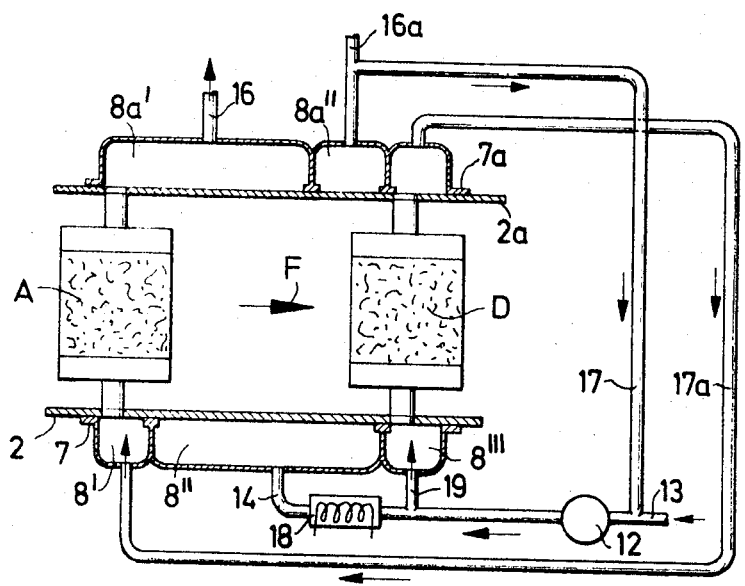
FIG. 8 is a view similar to FIG. 7 showing still another embodiment.

Coming, finally, to the embodiment illustrated in FIG. 8 it will be seen that there is provided in essence a combination of the embodiment of FIG. 7 with that of FIG. 5. This means that during the second half of the regenerating cycle the regenerating air is first supplied to the blower 12 and from there to the heating chamber 18 where it is reheated and then utilized towards the end of the regenerating cycle (during the cooling phase) of one chamber, this air is used directly for pre-regenerating or drying the next chamber. Thus, in the illustration of FIG. 8 the chamber A is predried with cooling air via the conduit 17a which cooling air is discharged to the ambient atmosphere through outlet 16. The chamber A then receives heated air through the conduit 14, which air is discharged to the ambient atmosphere through outlet 16. Heated air supplied to chamber A is subsequently recirculated via the conduit 17 to the blower 12, totally or partially (in the latter case some venting will occur at the outlet 16a and some intake of fresh air at the inlet 13 and , in the fourth stage of operation (which takes place simultaneously with the first stage) cooling is effected for the chamber D via the conduit 19 with the air being recirculated via the conduit 17a into the chamber A.

It will be appreciated that the present invention can be utilized not only in the types of apparatus illustrated, but also in the types which do not use a flat plate control component or components, but instead use valves which effect switching of the chambers into and out of the various regenerating and adsorption circuits. The invention is particularly advantageous, however, in connection with adsorbing apparatus utilizing such flat plate valve control components because the technical expenditure in terms of complexity of construction, is very low. It is only necessary in this type of construction to provide additional divider walls in the various hoods and to provide some simple conduit connections between the inlet and the outlet side, whereas the provision of additional valves or time dependent control arrangements with relays or other devices is not necessary.

The same advantages are of course obtained by utilizing the present invention in the type of adsorber apparatus in which the adsorber medium is accommodated in a cylindrical or otherwise configurated container which rotates and which has various segments of its interior connected with the conduits for regenerating or adsorbing fluid, so that these segments in effect also constitute "chambers" in the interior of the container.

It will be understood that each of the elements described above, or two or more together, may also find a useful application in other types of applications differing from the types described above.

While the invention has been illustrated and described as embodied in an adsorber construction, it is not intended to be limited to the details shown, since various modifications and structural changes may be made without departing in any way from the spirit of the present invention.

Without further analysis the foregoing will so fully reveal the gist of the present invention that others can by apply current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An adsorber, particularly for adsorbing moisture from air, comprising
   a plurality of vessels defining a plurality of discrete chambers each containing an adsorption medium and each having an inlet and an outlet;
   a rotary valve adjacent said outlets and including a rotary plate mounted on said vessels and provided with openings which communicate with said outlets, and a stationary plate adjacent said rotary plate and having circumferentially extending arcuate slots which are adapted to register with the respective openings in response to rotation of said rotary plate;

a pair of discrete hoods covering and communicating with one of said slots and each being provided with a separate discharge port;

adsorption-fluid circulating means, including incoming pipe line means communicating with respective ones of said inlets and outgoing pipe line means communicating with the other of said arcuate slots and with said incoming pipe line means, for the passage of adsorption fluid to and from said chambers;

regenerative-fluid circulating means, including first pipe line means communicating with respective other ones of said inlets and second pipe line means communicating with one of said discharge ports and with said first pipe line means, for the passage of regenerative fluid to and from said chambers;

heating means interposed in said second pipe line means for heating regenerative fluid passing therethrough;

venting pipe means communicating with the other of said discharge ports; and a conduit communicating with the ambient atmosphere and with said respective other inlets for admixing ambient air with the regenerative fluid being circulated by said regenerative fluid circulating means.

2. An adsorber as defined in claim 1; further comprising an additional rotary valve adjacent said inlets and including an additional rotary plate mounted on said vessels and provided with additional openings which communicate with said inlets, and an additional stationary plate adjacent said additional rotary plate and having circumferentially extending additional arcuate slots adapted to register with the respective additional openings in response to rotation of said additional rotary plate; and wherein said incoming and second pipe line means communicate with respective ones of said additional slots.

3. An absorber as defined in claim 1, wherein said conduit communicates with said second pipe line means, and via the same with said respective other inlets.

* * * * *